July 5, 1955  J. ALDER  2,712,243
V-BELT GEARING

Filed May 21, 1951  4 Sheets-Sheet 4

INVENTOR.
Jean Alder
BY

United States Patent Office 2,712,243
Patented July 5, 1955

2,712,243
V-BELT GEARING
Jean Alder, Zurich, Switzerland

Application May 21, 1951, Serial No. 227,325

Claims priority, application Switzerland May 22, 1950

17 Claims. (Cl. 74—230.17)

The invention relates to V-belt gearing for the stepless variation of the transmission ratio of two coaxial shafts (infinitesimally variable gearing).

V-belt gearing for the stepless variation of the ratio of transmission of two coaxial shafts having four V-belt pulleys, each pulley consisting of a pair of frustro-conical discs with two V-belts running over them have already been proposed, in which one disc of one V-belt pulley is keyed axially immovable on the driving shaft and one disc of another V-belt pulley is keyed axially immovable on the driven shaft, and between these discs two complementary discs cooperating with them to form adjustable V-belt pulleys are arranged axially shiftable on their shaft, while on a further shaft two more discs are arranged axially immovable and two further complementary discs cooperating with the same to form two more adjustable V-belt pulleys are arranged axially shiftable. Moreover it has already been suggested that the difficulty arising with V-belt gearing of this kind, namely that the frustro-conical discs which are axially shiftable for the purpose of varying the transmission ratio get out of line with their shaft owing to the eccentrical force applied to them by the V-belt, may be overcome thereby that the two frustro-conical discs arranged axially shiftable on a common shaft are connected with one another, so that they support one another and the tilting forces applied by the V-belt on to these discs cancel one another out. It has been found, however, in practice, that although one succeeds by these proposals in overcoming to a great extent, the detrimental effect of the eccentrical forces applied by the V-belts on to the frustro-conical discs it happens frequently that the shift keys, by means of which the frustro-conical discs are coupled axially shiftable to their shafts have got stuck, so that a variation of the ratio of transmission becomes impossible.

It is the main object of the invention to overcome this difficulty. Further objects will appear from the description of two embodiments of the invention given later by way of example.

According to the present invention a V-belt gearing for the stepless variation of the transmission ratio of two coaxial shafts comprises four pairs of frustro-conical discs, forming four V-belt pulleys, two V-belts each running over two of the said V-belt pulleys, the first one of the said discs being fixedly keyed to the driving shaft and a second one of said discs being fixedly keyed to the driven shaft, a third and a fourth of the said discs connected with one another axially but free to rotate relative to one another and to the driven shaft being arranged axially shiftable on the driven shaft, the said third disc being in torque connection and forming a pair with the said first disc on the driving shaft and the said fourth disc in torque connection and forming a pair with the said second disc on the driven shaft, moreover comprising four frustro-conical discs rotatably arranged in two pairs on an axially shiftable rotationally stationary axle parallel to the driven shaft, the two inner discs of the said last mentioned pairs being axially connected with one another and both axially restrained, while the two outer discs of the said last mentioned pairs are axially located on the said shiftable axle in such a manner that these two outer discs take part in any axial shifting of the said axle for the purpose of varying the transmission ratio of the V-belt gearing.

In order that the invention may be better understood and readily carried into effect, two embodiments thereof will now be described by way of example with reference to the accompanying drawings, in which.

Figure 1:
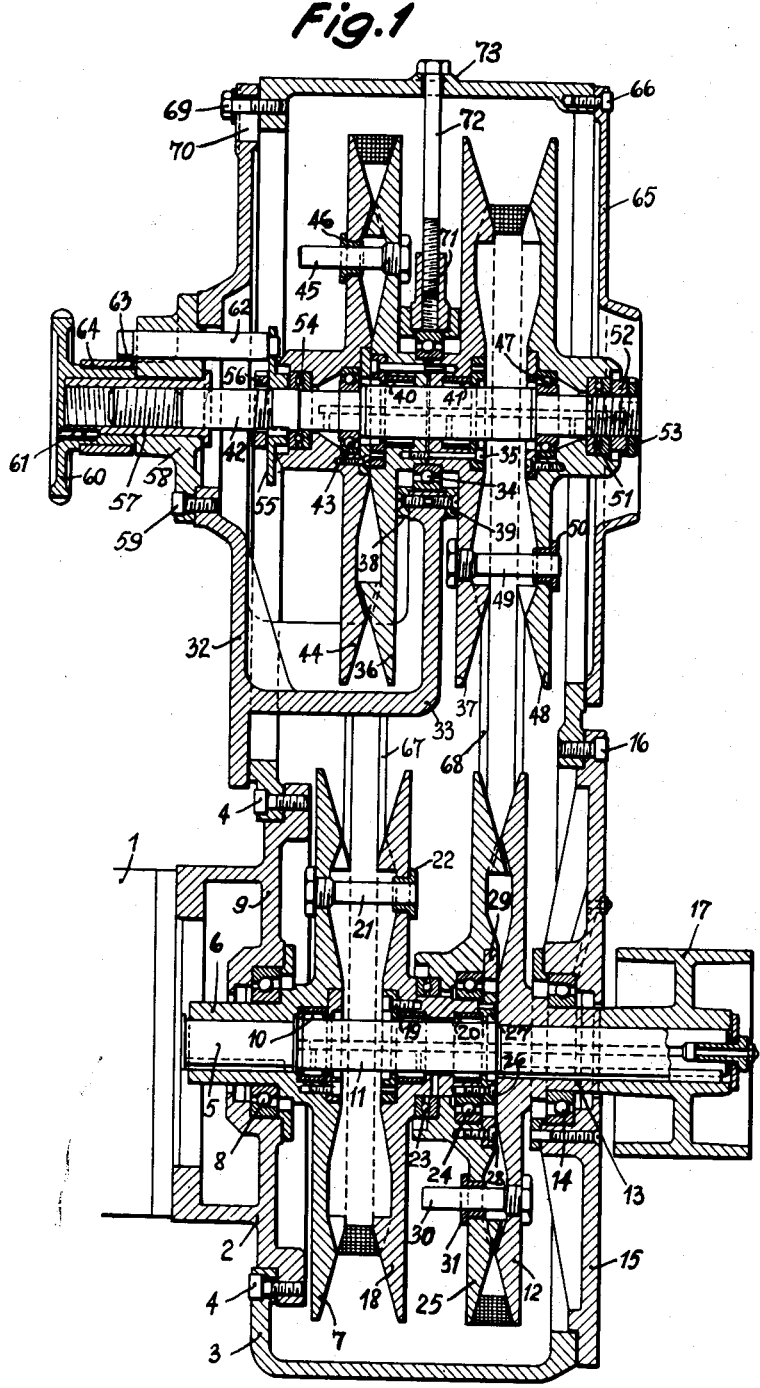
Fig. 1 is an axial section through one embodiment of the V-belt gearing according to the invention.
Figure 2:
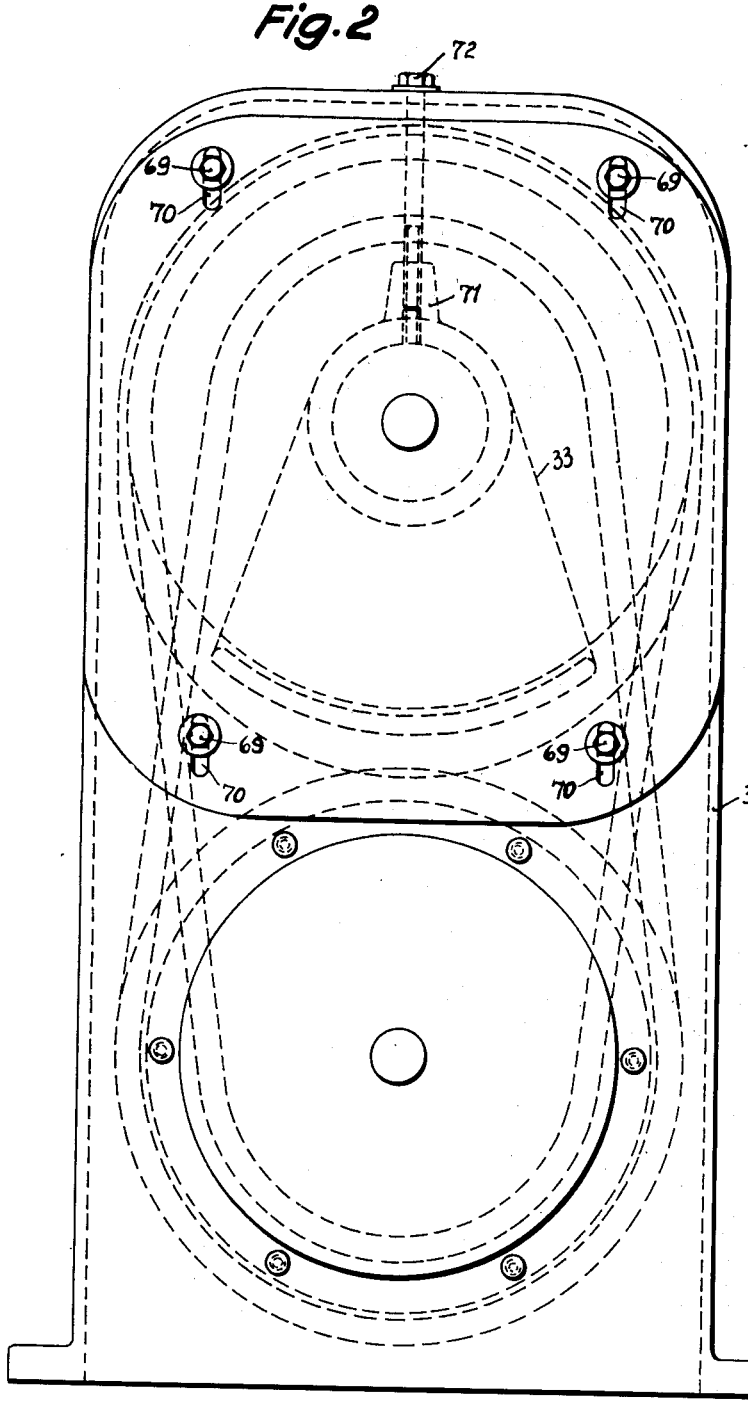
Fig. 2 is a lateral view thereto.

Referring first to Figs. 1 and 2, the casing 1 of an electric motor (otherwise not shown) is attached to a bearing bracket 2, which is inserted into a casing 3 and attached thereto by means of screws 4. The said casing 3 encloses the V-belt gearing as a whole. On the stub shaft 5 of the said electric motor which projects into the said bearing bracket 2 a first frustroconical disc 7 having a long hub 6 is keyed fixedly in the axial direction. The said hub 6 of this disc 7 is journalled in a ball bearing 8 which is housed in a partition wall 9 of the bearing bracket. One end of a shaft 11, which is coaxial to the stub shaft 5 and is to be driven at variable speed, is journalled in the frustro-conical disc 7 in a needle bearing 10. On this shaft 11 a second frustro-conical disc 12 is keyed fixedly in the axial direction, the hub 13 of which disc 12 is journalled in a ball bearing 14 housed in a bearing bracket 15, which in turn is inserted into an opening on the opposite side of the casing 3 to which it is attached by means of screws 16. On the end of the shaft 11 lying outside the bearing bracket 15 a belt pulley 17 is keyed. Between the said first and second frustro-conical discs 7 and 12, a third frustro-conical disc 18 is journalled on the shaft 11 in two needle bearings 19 and 20 housed in a long hub of said third disc which hub is directed towards the disc 12. This third disc 18 forms a pair and cooperates with the said first disc 7 and is freely rotatable and shiftable with respect to the said driven shaft, but coupled for rotation with the said first disc 7 by a bolt 21 which is fixedly inserted into said disc 7 parallel to the axis of rotation thereof and engages slidably into a bush 22 inserted into the said third disc 18. The first and the third frustro-conical discs 7 and 18 thus form between themselves a first adjustable V-belt pulley.

On the hub of the said third frustro-conical disc 18 a fourth frustro-conical disc 25 is journalled freely rotatable by means of a thrust ball bearing 23 and of a radial ball bearing 24, which fourth disc cooperates with the said second disc 12 and forms with it a second adjustable V-belt pulley. By means of a ring 27 attached by screws 26 to the hub of the disc 18 and acting on the inner race of the ball bearing 24, and by means of a ring 29 attached by screws 28 to the frustro-conical disc 25, the latter is secured in the axial direction on the hub of the frustro-conical disc 18. The disc 25 is coupled with the disc 12 by a bolt 30 fixedly inserted into the latter parallel to the axis of rotation thereof which bolt engages slidably into a bush 31 inserted into the disc 25.

On top of the opening into which the bearing bracket 2 is inserted, the casing 3 has another opening, into which the bracket 32 is inserted. This bracket 32 carries a support 33 extending into the casing 3, on which support the hubs of a fifth and a sixth frustro-conical disc 36 and 37, connected with one another by screws 35, are journalled in a ball bearing 34, the said discs being arranged back to back. The outer race of the said ball bearing 34 is inserted into a bearing eye of the support 33 and is held therein by two rings 38 and 39 which are attached to the support 33 by means of screws and prevent the frustro-conical discs 36 and 37 from being shifted axially. The said discs 36, 37 are journalled by means of two needle bearings 40 and 41 on an axially shiftable axle 42. With the fifth frustro-conical disc 36 cooperates a seventh frustro-conical disc 44 which is journalled on the axle 42 in a ball bearing 43 abutting with its inner race against a shoulder of the said axle 42. This disc 44 is coupled with the disc 36 by a bolt 45 fixedly inserted into the latter parallel to the axis of rotation thereof which bolt engages slidably into a bush 46 inserted into the disc 44, so that the discs 36, 44 form together a third adjustable V-belt pulley.

With the sixth frustro-conical disc 37 cooperates an eighth frustro-conical disc 48 which is journalled on the axle 42 in a ball bearing 47 the inner race of which abuts against a shoulder of said axle 42. This disc 48 is coupled with the disc 37 by a bolt 49 fixedly inserted into the latter parallel to the axis of rotation thereof which bolt engages slidably into a bush 50 inserted into the disc 47, whereby the said sixth and eighth frustro-conical discs 37, 48 form together a fourth adjustable V-belt pulley.

Into the outer face of the hub of the disc 48 a thrust ball bearing 51 is inserted which is acted upon by a pressure ring 52 screwed on to a thread at the end of the axle 42 and secured there by a lock nut 53, in such a manner that the frustro-conical disc 48 is secured in the axial direction on the axle 42. Into the hub of the disc 44 which is pointing the opposite way there is inserted likewise a thrust ball bearing 54, which is acted upon by a pressure ring 55 arranged on the axle 42 and held there by a lock nut 56 screwed on to a thread of the axle 42, in such a manner that the frustro-conical disc 44, too, is secured in the axial direction on the axle 42. The end of the said axle 42 on the same side is provided with a thread screwed into a tapped bush 57 which is journalled rotatably but is restrained axially in the bore of a bearing cover 58, which closes an opening of the bracket 32 and is attached to latter by means of screws 59. Outside the bearing cover 58 a hand wheel 60 is arranged on the tapped bush 57 to which it is connected by a screw 61. On the pressure ring 55 a bolt 62 is attached parallel to the axle 42 which bolt is guided in a bore of the bearing cover 58 and projects beyond the latter. At its outer end this bolt 62 has a pointer edge 63 which slides over a ring 64 arranged on the hub of the hand wheel 60 and carrying a scale, on which the said pointer edge 63 indicates the transmission ratio adjusted of the V-belt gearing, or the actual number of revolutions per minute of the driven shaft, as the case may be. On the side opposite the bracket 32 the casing 3 has also an opening which is closed by a cover 65 attached to said casing 3 by means of screws 66.

A V-belt 67 runs over the two V-belt pulleys formed by the frustro-conical discs 7, 18 on the one hand and by the frustro-conical discs 36, 44 on the other hand, and a V-belt 68 runs over the two V-belt pulleys formed by the frustro-conical discs 12, 25 on the one hand and by the frustro-conical discs 37, 48 on the other hand. In order to apply the right tension to these V-belts 67 and 68 and/or in order to re-tighten the same, the perpendicular distance between the axes of the stub shaft 5 and shaft 11 on the one hand, and the axle 42 on the other hand is made adjustable. For this purpose the bracket 32 is not attached rigidly on the casing 3 but by means of threaded bolts 69 screwed into the casing 3 which lie in slots 70 provided in the bracket 32. The support 33 has on top a projection 71 with a threaded bore perpendicular to the axle 42 into which bore a screw 72 is screwed which passes through an opening 73 in the top of the casing 3 and the head of which abuts against the top of the casing 3. The bracket 32 is accordingly suspended on this screw 72, and when the latter is turned the same is screwed more or less deeply into the thread of the projection 71, whereby the perpendicular distance of the axle 42 from the axis of the stub shaft 5 and of the shaft 11 is varied.

The shaft 11 has an axial lubrication duct starting from its end on the side of the frustro-conical disc 12 from which radially directed branches are branched off which supply lubricant to the needle bearings 10, 19 and 20. Likewise, the axle 42 is provided with an axial lubrication duct from which radially directed branches are branched-off which supply the needle bearings 40 and 41 as well as the radial ball bearings 43 and 47 and the thrust ball bearings 51 and 54 with lubricant. The lubrication of the ball bearings 8, 14, 23, 24 and 34 does not offer any difficulties. A faultless lubrication of all bearing points of the V-belt gearing is accordingly assured and does not require any dismantling.

In order to allow the V-belt pulleys arranged in the said four pairs to be grouped in close proximity of one another, all their frustro-conical discs have on the circumference of the inner edge of their frustro-conical faces recesses spaced at equal intervals, so that the discs of each pair of frustro-conical discs can be telescoped into one another like the components of a dog clutch.

In order to vary the ratio of transmission of the V-belt gearing described, the hand wheel 60 is turned. This has the effect that the axle 42 is shifted axially whereby the distance of the frustro-conical disc 44 from its associated disc 36, which is restrained in the axial direction, is varied and, conversely, the distance of the frustro-conical disc 48 from its associated disc 37, which is restrained in the axial direction, is varied in the opposite sense. The effective radius of the V-belt pulley 44, 36 is accordingly enlarged or reduced to the same extent as the effective radius of the V-belt pulley 48, 37 is reduced or enlarged, respectively. The axially shiftable frustro-conical discs 18 and 25, which are connected to one another for translational movement, are automatically shifted on the shaft 11 by the tensioned V-belts 67 and 68, to wit in the sense, that the effective radius of the V-belt pulley 7, 18 is reduced, when the effective radius of the V-belt pulley 44, 36 is increased, and the effective radius of the V-belt pulley 12, 25 is increased when the effective radius of the V-belt pulley 48, 37 is reduced, and vice versa. The ratio of transmission adjusted for the time being of the V-belt gearing or alternatively the number of revolutions per minutes of the output shaft 11 can be read off at any time from the scale of the ring 64, by the aid of the pointer edge 63 of the bolt 62.

The V-belt gearing described has no more slide keys at all, which could affect the slidability of the axially shiftable components.

Figure 3:
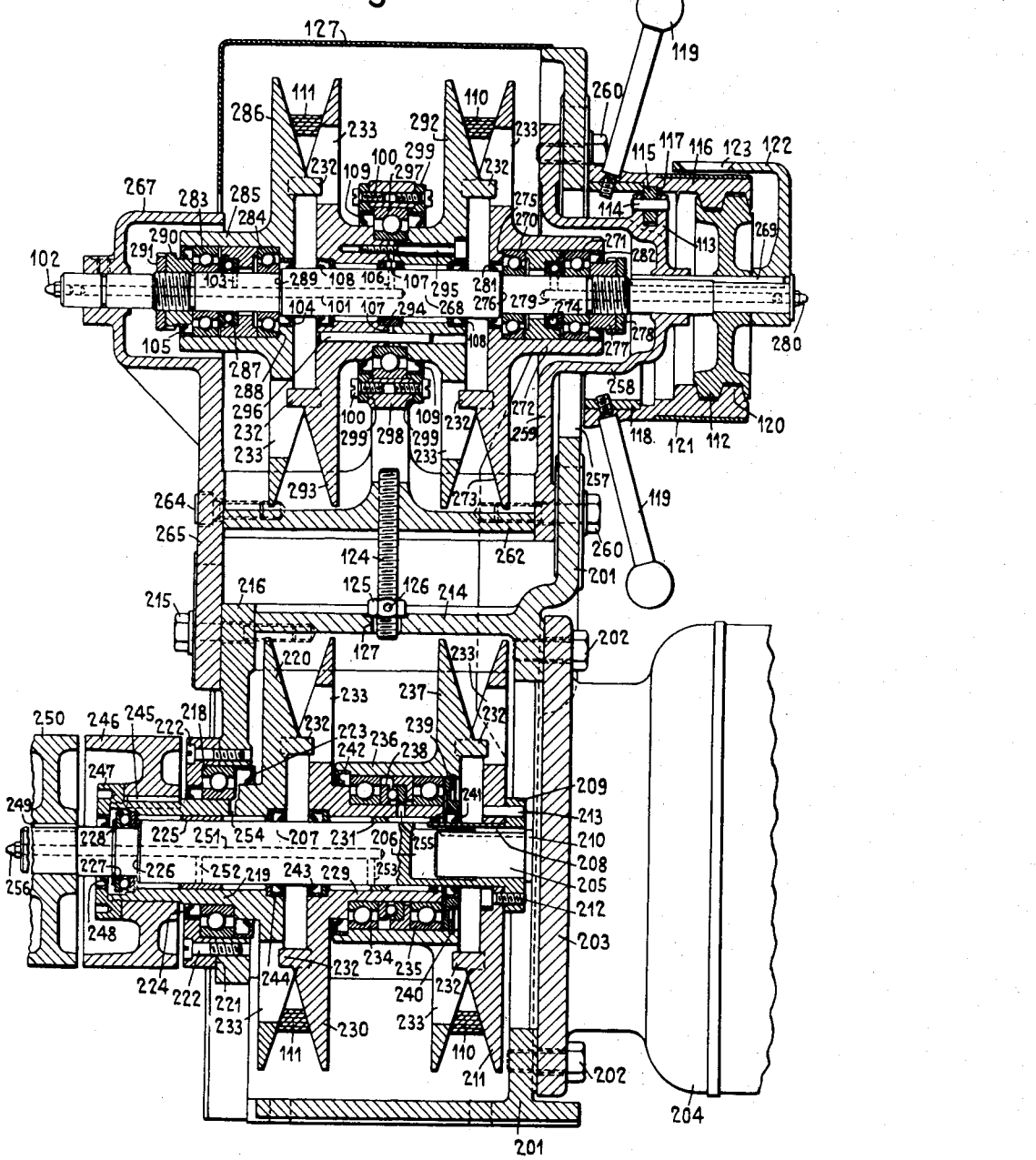
Fig. 3 is an axial section through a second embodiment of the V-belt gearing according to the invention.
Figure 4:
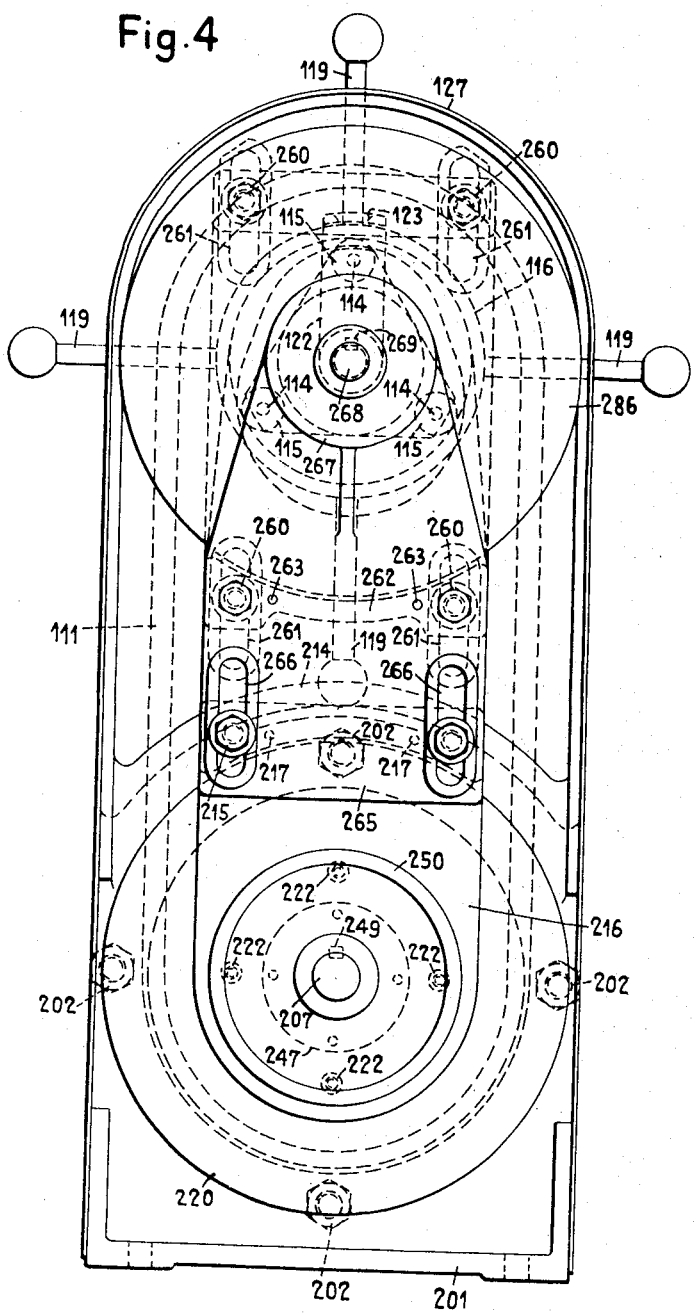
Fig. 4 is a lateral view to Fig. 3.

The second embodiment, which will be described later in detail with reference to Figs. 3 and 4 is a development of the infinitely variable V-belt gearing according to the invention and comprises an upright to which the driving electric motor is rigidly attached. This upright has a bracket on which a bearing plate is fixedly arranged. A ball bearing is inserted into said bearing plate in which the hub of a frustro-conical disc arranged inside this bearing plate is journalled. The said frusto-conical disc forms part of the pair of discs constituting the driven V-belt pulley. The said hub forms the driven shaft and in it a shaft is rotatably journalled which is fixedly connected with the stub shaft of the driving electric motor.

Moreover on the said upright two bearing plates are adjustably arranged and connected with one another. In these bearing plates the aforesaid longitudinally shiftable axle is axially slidable but restrained from rotation. On this later axle the aforesaid third and fourth V-belt pulleys are journalled freely rotatable.

Referring now particularly to Figs. 3 and 4, the upright 201 is shown to be open on the left hand side and provided with an opening on the opposite side. Outside of this upright 201 the flange 203 of the casing of an electric motor 204 is attached by means of four screws 202, which flange covers the said opening of the upright 201. The stub shaft 205 of the electric motor 204 engages into an axial bore 206 of a shaft 207 to which it is keyed by means of a key 208. The shaft 207 has on its end pointing towards the electric motor 204 a flange 209 which abuts on a shoulder 210 of the stub shaft 205 of the electric motor 204. On the shaft 207 a frustro-conical disc 211 is arranged which is attached to the flange 209 by means of three screws 212 and is pinned to this flange 209 by means of three dowel pins 213. The upright 201 has on its middle portion a bracket 214 which is arched for the purpose of increasing its stiffness. On the free end of this bracket 214 a bearing plate 216 is attached by means of two head screws 215 and pinned by means of two dowel pins 217, whereby it is fixedly located. In this bearing plate 216 a ball bearing 218 is inserted in which the hub 219 of a frustro-conical disc 220 is journalled which lies inside of the bearing plate 216. The ball bearing 218 is held by a ring 221 which is attached outside on the bearing plate 216 by means of four screws 222. In the bearing plate 216 a sealing sleeve 223 is inserted, inboard of the ball bearing 218, and into the ring 221 a sealing sleeve 224 is inserted outboard of the ball bearing 218. In the hub 219 of the frustro-conical disc 220 a shaft 207 is journalled in needle bearings 225. In the outer end of hub 219 a thrust ball bearing 227 is arranged on the shaft 207 so as to abut against a shoulder 226 of the latter, which thrust bearing is held by a circular clip 228 inserted in a groove of the shaft 207. The hub 229 of a frustro-conical disc 230, which cooperates with the frustro-conical disc 220, is journalled rotatably and axially shiftable on the shaft 207 by means of needle bearings 231. The frustro-conical discs 220 and 230 have on their juxtaposed frustro-conical faces projections 232 and recesses 233, the projections 232 of the one frustro-conical disc 220 or 230 engaging into the recesses 233 of the other frustro-conical disc 230 or 220, respectively, whereby these two frustro-conical discs 220 and 230 are coupled with one another for rotation and form together a V-belt pulley. On the hub 229 of the frustro-conical disc 230 the hub 236 of a further frustro-conical disc 237 is rotatably journalled on two ball bearings 234 and 235, which disc 237 cooperates with the frustro-conical disc 211 so as to form a V-belt pulley with it. The frustro-conical discs 211 and 237 are coupled with one another for rotation by means of projections 232 and recesses 233 in the same manner as the discs 220 and 230. Between the two radial ball bearings 234 and 235 a thrust ball bearing 238 is arranged. The ball bearing 234 abuts on a shoulder of the hub 229, and the ball bearing 235 is held by a ring 239 which is in turn held by a circular clip 240 which is inserted into a groove in the hub 236. Between the ring 239 and shaft 207 a sealing sleeve 241 is inserted, and likewise a sealing sleeve 242 is inserted into the end of the hub 236 outside the ball bearing 234. In the hub 229 of frustro-conical disc 230 a sealing sleeve 243 is inserted, and likewise a sealing sleeve 244 is inserted into the hub of the frustro-conical disc 220, which sealing sleeves seal off the needle bearings 231 and 225, respectively. On the portion of the hub 219 of the frusto-conical disc 220 outside the bearing plate 216 a belt drive pulley 246 is keyed by means of a key 245, which pulley is held axially by means of a tapped ring 247 which is screwed on a thread at the end of the hub 219. Into this tapped ring 247 a sealing sleeve 248 is inserted. On the end of the shaft 207 which projects beyond the belt drive pulley 246 a second belt drive pulley 250 is keyed by means of a key 249, which rotates with the speed of the electric motor 204. In the shaft 207 a lubricating duct 251 is provided from which a branch 252 leads to the needle bearing 225, and a branch 253 leads to the needle bearing 231. In the hub 219 of the frustro-conical disc 220 a duct 254 is provided through which the ball bearing 218 is supplied with lubricant. In the hub of the frustro-conical disc 230 there is also provided a duct, 255, through which the radial ball bearings 234 and 235 as well as the thrust ball bearing 238 are supplied with lubricant. On the free end of the shaft 207 the lubrication duct 251 is closed by a lubricating nipple 256. The sealing sleeves 223, 224, 241, 242, 243, 244 and 248 prevent the leakage of the lubricant.

On its upper portion the upright 201 has a wide opening 257 in which the bearing portion 258 of a bearing plate 259 lies with wide clearance, which portion 258 is bulged out towards the side of the electric motor 204. The bearing plate 259 abuts on the other side of the upright 201 and is clamped thereto by means of four screws 260 which lie in vertical slots 261 of the upright 201. The two upper head screws 260 are screwed into tapped bores of the bearing plate 259, while the two lower head screws 260 freely penetrate the bearing plate 259 and are screwed into the tapped bores of a bridge 262 abutting against the bearing plate 259, and hold the said bearing plate 259 clamped fast between the said bridge 262 and the upright 201. The bridge 262 is fixed in its position relative to the bearing plate 259 by means of two dowel pins 263. On the other end of the bridge 262 a further bearing plate 265 is attached by means of two screws 264 and secured in its accurate position by two dowel pins 263. On its lower part the bearing plate 265 has two vertical slots 266 in which the shanks of the head screws 215 lie with clearance, by means of which screws the bearing plate 216 is attached to the bracket 214. On its upper part the bearing plate 265 has an outward bulging bearing portion 267 which lies in accurate juxtaposition to the bearing portion 258.

In the bearing portions 258 and 267 an axle 268 is guided axially shiftable which is prevented from rotating by a key 269 inserted into it which is guided in a groove in the bearing portion 258. On one shank of this shaft 268 the hub 272 of a frustro-conical disc 273 is rotatably journalled on two radial ball bearings 270 and 271. Between the two radial ball bearings 270 and 271 a thrust ball bearing 274 is arranged. The radial ball bearing 270 abuts outside against a shoulder 275 in the bore of the hub 272 and inside on a shoulder 276 of the axle 268, while the radial ball bearing 271 is held by a tapped bush 277 which is screwed on to a thread of the axle 268 and is secured by a lock nut 278. In this manner the frustro-conical disc 273 is held axially immovable on the axle 268. A lubricating duct 279 which is plugged by a lubricating nipple 280 leads from the adjacent end of the axle 268 to the thrust ball bearing 274 and to the radial ball bearings 270 and 271. Two sealing sleeves 281 and 282 inserted into the hub 272 of the frustro-conical disc 273 prevent leakage of the lubricant.

On the other shank of the axle 268 the hub 285 of a further frustro-conical disc 266 is rotatably journalled on two radial ball bearings 283 and 284.

Between these radial bearings 283 and 284 a thrust ball bearing 287 is arranged. The radial ball bearing 284 abuts outside on a shoulder 288 in the bore of the hub 285 and inside on a shoulder 289 of the axle 268, while the radial ball bearing 283 is held by a tapped sleeve 290 screwed on to a thread of the axle 268 and secured by a lock nut 291. In this manner the frustro-conical disc 286 is held axially immovable on the axle 268.

Between the frustro-conical discs 273 and 286 two further frustro-conical discs 292 and 293 are rotatably journalled on needle bearings 294 in which the axle 268 is axially shiftable. The frustro-conical disc 292 cooperates with the frustro-conical disc 273 and forms with it a V-belt pulley, and the frustro-conical disc 293 cooperates with the frustro-conical disc 286 and forms with it another V-belt pulley. Like the frustro-conical discs 220, 230, the frustro-conical discs 273, 292, respectively, are coupled with one another for rotation by means of projections 232 and recesses 233. The hubs of the two frustro-conical discs 292 and 293 are fixedly connected with one another by means of three screws 295 and of three dowel pins 296.

In their ends facing one another the hubs of the two frustro-conical discs 292, 293 have a shoulder each, on which the inner race of a radial ball bearing 297 abuts. The outer race of this ball bearing 297 is inserted into a bearing bracket 298 arranged on the bridge member 262 and is held therein by two rings 299 which are attached by means of screws 100 on the bearing bracket 298 so as to be axially restrained.

From the other end of the axle 268, too, a lubricating duct 101 starts which is plugged outwards by a lubricating nipple 102. From this lubricating duct 101 a branch 103 branches off through which the thrust ball bearing 287 and the radial ball bearings 283 and 284 are supplied with lubricant. In order to prevent the leakage of lubricant, two sealing sleeves 104 and 105 are inserted into the hub 285 of the frustro-conical disc 286. From the lubricating duct 101 a second duct 106 is branched off through which the needle bearings 294 and, through ducts 107 provided in the bearing bracket 298, also the radial ball bearing 297 is provided with lubricant. In order to prevent the leakage of lubricant, a sealing sleeve 108 is inserted into each of the hubs of the two frustro conical discs 292, 293 outside of the needle bearings 294, and a sealing sleeve 109 is inserted into each of the rings 299. Over the V-belt pulleys formed by the pairs of frustro-conical discs 211, 237 and 273, 292, respectively, runs a V-belt 110, and over the V-belt pulleys formed by the pairs of frustro-conical discs 220, 230 and 286, 293, respectively, runs a V-belt 111.

The variation of the transmission ratio of the V-belt gearing is effected by axially shifting the axle 268, and therewith the frustro-conical discs 273 and 286. When by shifting the axle 268 the disc 273 is brought nearer to the axially immovable disc 292 with which it is in torque connection, the effective diameter of the V-belt pulley consisting of the said discs 273, 292 is enlarged. At the same time the frustro-conical disc 286 is moved away from the axially immovable frustro-conical disc 293 with which it is in torque connection, and the effective diameter of the V-belt pulley consisting of the discs 286, 293 is accordingly reduced.

Thereby the frustro-conical discs 230 and 237 which are connected with another in the axial direction but are independent of one another for rotation, are shifted by the V-belts 110 and 111 in such a manner that the disc 237 is moved away from the disc 211, and the disc 230 is moved nearer to the disc 220, i. e. the effective diameter of the V-belt pulley consisting of the frustro-conical discs 211, 237 is reduced, and the effective diameter of the V-belt pulley consisting of the frustro-conical discs 220, 230 is enlarged.

On the whole, there results a reduction of the effective diameter of the driving V-belt pulley 211, 237, an increase of the effective diameter of the V-belt pulley 273, 292 driven by the V-belt 110, a reduction of the effective diameter of V-belt pulley 286, 293 which is in torque connection with the latter, and an increase of the effective diameter of the V-belt pulley 220, 230 driven by the V-belt 111 with which pulley 220, 230 the belt drive pulley 250 is in torque connection, i. e. a reduction of the ratio of transmission. Conversely, by shifting the axle 268 in the opposite direction an increase of the ratio of transmission is effected.

For the shifting of the axle 268 the following provision is made; on the end of the axle 268 which protrudes beyond the bearing portion 258 a helical member 112 is fixedly attached which is restrained from rotating by the key 269. This helical member 112 has a steep thread, the axial pitch of which corresponds to the measure by which the axle 268 is axially shiftable. The bearing portion 258 has outside three lugs 113. In each of these lugs 113 a roller 115 is journalled on an axle 114, and a sleeve 116 is rotatable on these three rollers 115. The said rollers 115 abut on the one hand against a shoulder 117 in the sleeve 116, and on the other hand against a ring 118 inserted into this sleeve 116 which is fixed to the said sleeve 116 by four operating levers 119, inserted and screwed into four tapped bores provided therein. The sleeve 116 is accordingly restrained in the axial direction. In its outer end the bush 116 has a female thread 120 for the thread of the helical member 112. By turning the sleeve 116 by means of the operating levers 119 the non-rotational helical member 112 and the axle 268 which is fixedly connected to it are shifted in the axial direction.

On the outer end of the sleeve 116 a scale ring 121 is fixedly arranged. On the outer end of the axle 268 an arm 122 is fixedly attached which is restrained from turning by a key 269. This arm 122 reaches over the scale ring 121 arranged on the sleeve 116 and has in this portion a window 123 with an adjustment edge, by means of which the output speed of rotation desired or the transmission ratio desired can be adjusted on the scale of the scale ring 121.

The bridge member 262 has on its bottom side a vertical tapped bore into which a threaded bolt 124 can be screwed. On this threaded bolt, a nut 125 is arranged, which abuts against the bracket 214 and is secured by a splint 126, while the end of the threaded bolt 124 is received by an aperture 127 in the bracket 214. When the tension of the V-belts 110 and 111 is to be regulated, the head screws 260 and 215 are first loosened and then the nut 125, and with it the threaded bolt 124, are turned so that the latter is screwed more or less deeply into the tapped bore of the bridge member 262, whereby the perpendicular distance of the axle 268 from the shaft 207 is varied until the V-belts 110 and 111 have the desired tension. Subsequently, the head screws 260 and 215 are tightened again.

In order to prevent foreign matter from penetrating into the gearing and from fouling the V-belts 110 and 111 and the V-belt pulleys, the V-belt gearing is provided with a detachable sheet metal screen 127.

While I have described what may be considered to be two particularly advantageous embodiments of my invention, I wish it to be understood that I do not limit myself to the particular details and dimensions shown and described, for obvious modifications will occur to a person skilled in the art according to the circumstances and requirements in which such a variable V-belt gearing may be applied.

What I claim as my invention and desire to secure by Letters Patent, is:

1. An infinitely variable V-belt gearing comprising a casing, a driving shaft and a driven shaft journalled in the said casing coaxially in alignment with one another for independent rotation, an axle restrained from rotating but longitudinally shiftable arranged parallel to the said two shafts in the said casing; four V-belt pulleys each including a pair of cooperating frustro-conical discs, the discs of each pair being coupled with one another for rotation and axially shiftable with respect to one another, one of the said pulleys being coupled with the driving shaft, a second one with the said driven shaft, and the third and fourth one journalled freely rotatable directly on the said axle in the same planes as the said first and second V-belt pulley, respectively, an endless V-belt running over the said first and third pulley, and another endless V-belt running over the said second and fourth pulley, the adjacent frustro-conical discs of the said first and second V-belt pulleys being coupled with one another for axial movement but free to rotate relative to one another, the adjacent frustro-conical discs of the said third and fourth V-belt pulleys being both axially restrained relative to the said casing and the two remote frustro-conical discs of the said third and fourth V-belt pulleys being axially fixed on the said shiftable axle and rotatable with respect thereto; and control means adjusting the axial position of the said shiftable axle relative to the said casing.

2. An infinitely variable V-belt gearing as claimed in claim 1 comprising adjustment means for adjusting the distance between the said longitudinally shiftable axle and the said third and fourth V-belt pulleys journalled thereon on the one hand, and the common axis of the said driving shaft, coaxial driven shaft and the said first and second V-belt pulleys arranged thereon, respectively, on the other hand.

3. An infinitely variable V-belt gearing comprising a casing, a driving shaft and a driven shaft journalled in the said casing coaxially in alignment for independent rotation, a support member attached to the said casing slidably in a plane perpendicular to the axis of the said driving and driven shafts, an axle restrained for rotating but axially shiftable arranged in the said support member parallel to the common axis of the said driving and driven shafts, clamping means for arresting the said support member relative to the said casing, screw means engaging the said casing on the one hand and the said support member on the other hand, adjusting the distance of the said axle from the common axis of the said driving and driven shafts when the said clamping means are released; four V-belt pulleys each including a pair of cooperating frustro-conical discs, the discs of each pair being coupled with one another for rotation and axially shiftable with respect to one another, one of the said pulleys being coupled with the driving shaft, a second one with the said driven shaft, and the third and fourth one journalled freely rotatable directly on the said axle in the same planes as the said first and second V-belt pulley, respectively, an endless V-belt running over the said first and third pulley, and another endless V-belt running over the said second and fourth pulley, the adjacent frustro-conical discs of the said first and second V-belt pulleys being coupled with one another for axial movement but free to rotate relative to one another, the adjacent frustro-conical discs of the said third and fourth V-belt pulleys being both axially restrained relative to the said casing and the two remote frustro-conical discs of the said third and fourth V-belt pulleys being axially fixed and rotatable on the said shiftable axle; and control means adjusting the axial position of the said shiftable axle relative to the said support member.

4. An infinitely variable V-belt gearing as claimed in claim 3, wherein the said control means adjusting the axial position of the said shiftable axle relative to the said support member comprise a hand wheel journalled in the said support member coaxially with the said axle and freely rotatable but restrained axially, and a nut member fixedly connected to the said hand wheel, the adjacent end of the said axle being threaded complementarily to the said nut member and being in screw engagement therewith.

5. An infinitely variable V-belt gearing as claimed in claim 3 comprising a scale member and a pointer member each connected to one of the axially relatively movable components of the said gearing, the said pointer member playing over the said scale member, the said scale member being calibrated to indicate a parameter of the transmission ratio of the said V-belt gearing.

6. A V-belt gearing for the stepless variation of the transmission ratio, comprising in combination: a driving shaft and a driven shaft coaxial with one another, four V-belt pulleys, two V-belts each running over two of the said V-belt pulleys, each V-belt pulley including two frustro-conical discs, a first one of said frustro-conical discs being fixed to the said driving shaft, a second one of the said discs being fixed to the said driven shaft, a third and a fourth one of the said discs being journalled on the said driven shaft freely rotatable relative to it and to one another and connected with one another in the axial direction to be axially shiftable together on the said driven shaft, the said third disc being in torque connection with the said first disc on the said driving shaft, and the said fourth disc being in torque connection with the said second disc on the said driven shaft, an axle restrained from rotation but longitudinally shiftable, parallel to the said driving and driven shafts, four further frustro-conical discs journalled freely rotatable on the said axle, the two inner ones of the said last mentioned four discs being axially connected with one another and both restrained in the axial direction, and the two outer discs of the said last mentioned four discs being axially secured to the said longitudinally shiftable axle, the said two outer discs being shifted axially together with the said axle for varying the transmission ratio of the V-belt gearing.

7. A V-belt gearing as claimed in claim 6 comprising in addition: a hub extension of the said third frustro-conical disc pointing towards the said fourth frustro-conical disc, two needle bearings housed in the said third disc, two needle bearings housed in the said third disc on the said driven shaft, a radial ball bearing, a ring member and a thrust ball bearing arranged on the said extension and journalling the said fourth disc on the said third disc for rotation while connecting the said third and fourth disc in the axial direction with one another.

8. A V-belt gearing as claimed in claim 6 comprising in addition: a bolt inserted parallel to the axis of rotation into one frustro-conical disc of each pair of discs, and a bush inserted into the complementary frustro-conical disc of each pair, the said bolt slidably engaging into the said bush and forming an axially shiftable torque connection of the pair of the frustro-conical discs forming together a V-belt pulley.

9. A V-belt gearing as claimed in claim 6 comprising in addition: a support member arranged shiftable perpendicularly to the said axle and a bearing arranged on the said support member, the said two inner disc members being journalled in the said bearing.

10. A V-belt gearing as claimed in claim 9 comprising in addition: a casing having a lateral opening, a bracket member closing the said opening and carrying the said support member inside the said casing, a projection of the said support member having a tapped radial bore, a screw member passing through said casing and threaded into said tapped bore, a screw head connected to the said screw member and bearing on the said casing from outside, the said screw member when turned adjusting the position of the said support relative to the said casing, and clamping screws passing through holes in the said bracket member slotted in the direction of the adjustment, into the lateral face of the said casing around the said lateral opening.

11. A V-belt gearing as claimed in claim 10 comprising in addition: a bearing cap laterally attached to the said bracket member coaxially to the said longitudinally slidable axle, a threaded sleeve rotatably inserted into the said bearing cap but restrained in the axial direction relative to it, and a hand wheel fixedly connected to the said threaded sleeve outside the said bracket member, the adjacent end of said axle being threaded into the said sleeve so as to form a movable screw connection with it.

12. A V-belt gearing as claimed in claim 11, comprising in addition: a first ring member fixedly attached to the said axle, a bolt parallel to the said axle attached to the said ring member shiftably guided in a bore of the said bearing cap and having a pointer edge on its outer end, a second ring member arranged on the hub of the said hand wheel and provided with a scale on which the pointer edge of said bolt plays, the said scale indicating the transmission ratio of the V-belt gearing actually adjusted or, with a predetermined number of revolutions of the driving shaft, the actual number of revolutions of the said driven shaft.

13. An infinitesimally variable V-belt gearing comprising in combination: an upright, a driving shaft and a driven shaft arranged coaxially in alignment with one another, an electric motor in driving connection with the said driving shaft and rigidly attached to the said upright, a bracket arranged on said upright, a bearing plate fixedly attached to the said bracket, a ball bearing housed in said bearing plate, a first frustro-conical disc, including a hub portion, arranged on the inside of the said bearing plate, the said hub portion forming said driven shaft and being journalled in the said ball bearing, the said driving shaft being rotatably journalled in the said hub portion, a second frusto-conical disc fixedly attached to the said driving shaft adjacent the said electric motor, two complementary frustro-conical discs being journalled independently rotatable from, and axially shiftable with, one another on the said driving shaft, one of the said complementary frustro-conical discs being in torque connection with the said first frustro-conical disc and forming with it the output V-belt pulley of the said gearing, and the other complementary frustro-conical disc being in torque connection with the said second frustro-conical disc and forming with it the input V-belt pulley of the said gearing; two more bearing plates adjustably attached to the said upright, a bridge member connecting the last mentioned bearing plates with one another, an axle axially shiftable but restrained from rotating guided in the last mentioned bearing plates, four more frustro-conical discs rotatably journalled on the said axle, the two inner ones being fixedly connected with one another and restrained axially with respect to the said bridge member, and the two outer ones being axially secured on the said axially shiftable axle, each of the said outer discs forming together with one of the said inner discs a V-belt pulley cooperating with the said driving V-belt pulley and with the said driven V-belt pulley, respectively.

14. An infinitesimally variable V-belt gearing as claimed in claim 13, comprising in addition: an extension of the said driving shaft beyond the said driven belt drive pulley, and a second belt drive pulley keyed to the said extension and rotating at the speed of the driving electric motor.

15. An infinitesimally variable V-belt gearing as claimed in claim 13, comprising four head screws passing through longitudinal slots in said upright and being screwed into one of the last mentioned bearing plates in which the said axially shiftable non-rotational axle is guided, two more head screws screwed into the said bracket of the upright and passing through longitudinal slots in the other one of the last mentioned bearing plates parallel to the aforesaid slots, all of these slots running in the direction of the perpendicular distance of the said axially shiftable non-rotational axle from the said driving axle, whereby the two last mentioned bearing plates together with the said bridge member can be shifted in the said direction when the said head screws are loosened for the purpose of adjusting the said perpendicular distance.

16. An infinitesimally variable V-belt gearing as claimed in claim 15, comprising a threaded bolt screwed bolt screwed into a tapped bore on the underside of the said bridge member, and a nut screwed and splinted to the said threaded bolt abutting against the bracket of the said upright, whereby, after loosening the said head screws, by turning the said nut the said threaded bolt is screwed into the said tapped bore at varying depth and the distance between the said axially shiftable non-rotational axle and the said driving shaft is varied.

17. An infinitesimally variable V-belt gearing as claimed in claim 15, comprising a helical member rigidly fixed to an end of the said axially shiftable non-rotational axle projecting beyond one of the two last mentioned bearing plates, a sleeve provided with a female thread complementary to and engaged by the said helical member, the said sleeve being journalled rotatably and restrained axially on the said bearing plate, a scale ring arranged on the said sleeve, operating levers attached to the said sleeve, an arm fixedly attached to the said axially shiftable axle overlapping the said sleeve, a window having a pointer edge being arranged in the said arm over the said scale, the axial position of the said axially shiftable axle being adjustable by turning the said sleeve by means of the said operating levers, and the transmission ratio adjusted thereby being indicated by the said pointer edge on the said scale.

References Cited in the file of this patent

UNITED STATES PATENTS

| 1,854,018 | Carlberg | Apr. 12, 1932 |
| 2,293,638 | Clarkson | Aug. 18, 1942 |
| 2,348,940 | Voegeli | May 16, 1944 |
| 2,433,150 | Palm | Dec. 23, 1947 |
| 2,464,841 | Alexander | Mar. 22, 1949 |

FOREIGN PATENTS

| 379,589 | Italy | Mar. 30, 1940 |
| 255,530 | Switzerland | Jan. 17, 1949 |
| 630,556 | Great Britain | Oct. 17, 1949 |